(12) United States Patent
MacWilliams et al.

(10) Patent No.: US 6,253,302 B1
(45) Date of Patent: *Jun. 26, 2001

(54) METHOD AND APPARATUS FOR SUPPORTING MULTIPLE OVERLAPPING ADDRESS SPACES ON A SHARED BUS

(75) Inventors: Peter D. MacWilliams, Aloha; Stephen S. Pawlowski, Beaverton, both of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/705,684

(22) Filed: Aug. 29, 1996

(51) Int. Cl.[7] .................................................. G06F 12/00
(52) U.S. Cl. ................................................... 711/211
(58) Field of Search ..................... 395/401, 412, 395/497.03, 421.02, 421.01; 711/1, 147, 153, 211, 212; 710/100, 126

(56) References Cited

U.S. PATENT DOCUMENTS

| | | | |
|---|---|---|---|
| 4,799,187 | * 1/1989 | Einarson et al. | 364/900 |
| 4,870,704 | * 9/1989 | Matelan et al. | 364/200 |
| 4,987,537 | * 1/1991 | Kawata | 364/200 |
| 5,210,839 | * 5/1993 | Powell et al. | 395/400 |
| 5,388,104 | * 2/1995 | Shirotori et al. | 371/21.1 |
| 5,448,710 | * 9/1995 | Liu | 395/497.03 |
| 5,454,092 | * 9/1995 | Sibigtroth | 395/412 |
| 5,513,376 | * 4/1996 | Lohmeyer | 395/873 |
| 5,535,349 | * 7/1996 | Boaz et al. | 395/401 |

OTHER PUBLICATIONS

Popescu, Val, Merle Schultz, John Spracklen, Gary Gibson, Bruce Lightner and David Isaman, "The Metaflow Architecture", IEEE Micro, Jun. 1991, pp. 10–13 and 63–73.

* cited by examiner

Primary Examiner—Kevin Verbrugge
(74) Attorney, Agent, or Firm—Blakely, Sokoloff, Taylor & Zafman LLP

(57) ABSTRACT

A method and apparatus for supporting multiple overlapping address spaces on a shared bus includes both an address comparator and an address size indicator. The address comparator compares an address, corresponding to a request to be issued on the bus, to a plurality of address spaces. The address size indicator indicates a first address space of the plurality of address spaces to which the address corresponds.

9 Claims, 8 Drawing Sheets

*Note: The shaded vertical bar indicates one or more clock cycles are allowed between different phases.

METHOD AND APPARATUS FOR SUPPORTING MULTIPLE OVERLAPPING ADDRESS SPACES ON A SHARED BUS

BACKGROUND OF THE INVENTION

1. Field of the Invention

The present invention pertains to computer systems and computer system buses. More particularly, this invention relates to supporting multiple overlapping address spaces on a shared bus in a computer system.

2. Background

Modem computer systems typically have multiple agents coupled together via a system bus. Typically, the agents are integrated circuit chips with multiple pins coupling each agent to the bus. These agents may include, for example, a processor(s), a memory device(s), a mass storage device(s), etc. In order for the computer system to operate properly, these agents should be able to effectively communicate with each other via the bus.

Different agents in a computer system and different locations within these agents (e.g., a register or other memory location) are typically accessed via a particular address. The range of addresses which can be used by a particular agent is typically referred to as the address space of that agent. A typical range for address spaces used by modem computer systems is from 8 to 44 bits. As technology has advanced, the address space being supported by particular agents has increased in order to accommodate a wide range of agents and memory locations.

Often, newer agents support a larger address space than older agents. However, in order to increase flexibility in computer system design and provide backwards compatibility, it would be beneficial to provide a mechanism which supports smaller address spaces as well as newer, larger address spaces. The smaller and larger address spaces typically overlap. For example, the first 8-bit space of a 16-bit address space and the entire space of an 8-bit address space are the same, and thus are referred to as overlapping. Additionally, some newer agents (for example, input/output devices) may have no need to use the larger address spaces. Therefore, using additional pins on these agents in order to couple them to the bus needlessly increases the cost and physical size of the agents.

One solution to supporting multiple address spaces is to use different requests for different address spaces. For example, a request in an 8-bit address space and a request in a 16-bit address space would be two different commands, using different request lines on the bus. However, this solution greatly increases the number of control lines required on a bus, because a significant number of additional control lines is needed for each of the different address spaces which are supported. Thus, it would be beneficial to provide a mechanism for supporting different address spaces which does not require a significant number of additional control lines.

As will be described in more detail below, the present invention provides a method and apparatus for supporting multiple overlapping address spaces on a shared bus to achieve these and other desired results which will be apparent to those skilled in the art from the description that follows.

SUMMARY OF THE INVENTION

A method and apparatus for supporting multiple overlapping address paces on a shared bus is described herein. The apparatus includes both an address comparator and an address size indicator. The address comparator compares an address, corresponding to a request to be issued on the bus, to a plurality of address spaces. The address size indicator indicates a first address space of the plurality of address spaces to which the address corresponds.

According to one embodiment, the address size indicator encodes the first address space onto one or more control lines. The size of the address is then issued on the bus along with the address, thereby informing the other agents on the bus of the address space for the request.

Additionally, according to one embodiment, an agent which receives the address size indicator compares the address size to the address space(s) which it supports. If the address space is within the range supported by the agent, then the agent performs parity checking on the entire address. However, if the address space is outside the range supported by the agent, then the agent knows it is not the target of the request. Additionally, if the address space is outside the range supported by the agent, then the agent performs parity checking on only part of the address, rather than the entire address, thereby allowing the agent to identify any parity errors in that part of the address.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

In the discussions to follow, certain signals are discussed followed by a "#". This notation is used to indicate a signal which is active when in a low state (that is, a low voltage). It is to be appreciated, however, that the present invention includes implementations where these signals are active when in a high state rather than when in a low state. Similarly, the present invention includes implementations where signals discussed herein which are not followed by a "#" are active when in a low state.

In the discussions to follow, reference is made to overlapping address spaces. Address locations which can be accessed in either of two different address spaces are the overlapping portion of the address spaces. By way of example, two address spaces may be a 32-bit address space and a 36-bit address space. In this example, bits [31:0] are used to identify locations in the 32-bit address space and bits [35:0] are used to identify locations in the 36-bit address space. Thus, because the first 32 bits of each address space (bits [31:0]) are the same, the address spaces are said to overlap.

The present invention provides a mechanism for supporting multiple overlapping address spaces on a shared bus. An agent issuing a request on the bus provides an indication of the address space to which the request corresponds. This indication is then received by another agent(s) coupled to the bus. This allows the other agent to determine, for example, whether it can possibly be the target of the request, or whether it can perform party checking on the entire address received with the request.

Figure 1:
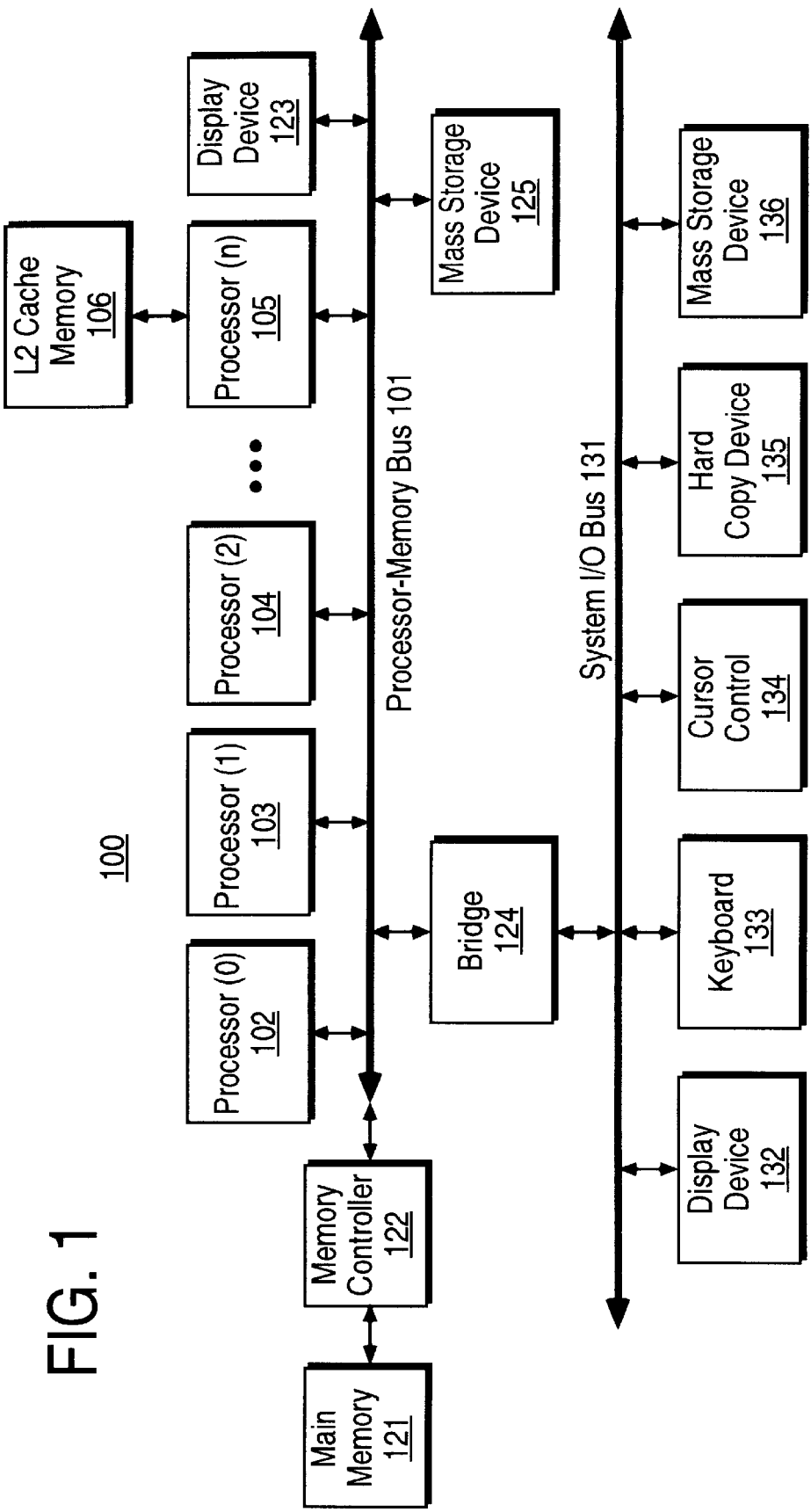
FIG. 1 illustrates a multiprocessor computer system such as may be used with one embodiment of the present invention.

FIG. 1 illustrates a multiprocessor computer system such as may be used with one embodiment of the present invention. The computer system 100 generally comprises a processor-memory bus or other communication means 101 for communicating information between different agents coupled to the bus 101, such as processors, bus bridges, memory devices, peripheral devices, etc. The processor-memory bus 101 includes arbitration, address, data and control buses (not shown). In one embodiment, each of the one or more processors 102, 103, 104, and 105 includes a small, extremely fast internal cache memory (not shown), commonly referred to as a level one (L1) cache memory for temporarily storing data and instructions on-chip. In addition, a bigger level two (L2) cache memory 106 can be coupled to any one of the processors, such as processor 105, for temporarily storing data and instructions for use by the processor(s). Each processor may have its own L2 cache, or some may share an L2 cache.

Processors 102, 103, and 104 may each be a parallel processor (a symmetric co-processor), such as a processor similar to or the same as processor 105. Alternatively, processor 102, 103, or 104 may be an asymmetric co-processor, such as a digital signal processor. In addition, processors 102 through 105 may include processors of different types. In one embodiment, the present invention includes Intel® Architecture microprocessors as processors 102 through 105, such as i386™, i486™, Pentium® or Pentium® Pro processors. However, the present invention may utilize any type of microprocessor architecture. It is to be appreciated that the particular architecture(s) used is not especially germane to the present invention.

The processor-memory bus 101 provides system access to the memory and input/output (I/O) subsystems. A memory controller 122 is coupled to the processor-memory bus 101 for controlling access to a random access memory (RAM) or other dynamic storage device 121 (commonly referred to as a main memory) for storing information and instructions for processors 102 through 105. A mass data storage device 125, such as a magnetic disk and disk drive, for storing information and instructions, and a display device 123, such as a cathode ray tube (CRT), liquid crystal display (LCD), etc., for displaying information to the computer user may be coupled to the processor-memory bus 101.

An input/output (I/O) bridge 124 may be coupled to the processor-memory bus 101 and a system I/O bus 131 to provide a communication path or gateway for devices on either processor-memory bus 101 or I/O bus 131 to access or transfer data between devices on the other bus. Essentially, the bridge 124 is an interface between the system I/O bus 131 and the processor-memory bus 101.

The I/O bus 131 communicates information between peripheral devices in the computer system. Devices that may be coupled to the system bus 131 include, for example, a display device 132 such as a cathode ray tube, liquid crystal display, etc., an alphanumeric input device 133 including alphanumeric and other keys, etc., for communicating information and command selections to other devices in the computer system (e.g., the processor 102) and a cursor control device 134 for controlling cursor movement. Moreover, a hard copy device 135, such as a plotter or printer, for providing a visual representation of the computer images and a mass storage device 136, such as a magnetic disk and disk drive, for storing information and instructions may also be coupled to the system bus.

In certain implementations of the present invention, additional processors or other components may be included. Additionally, in certain implementations components may be re-arranged. For example, the L2 cache memory 106 may lie between the processor 105 and the processor-memory bus 101. Furthermore, certain implementations of the present invention may not require nor include all of the above components. For example, the processors 102 through 104, the display device 123, or the mass storage device 125 may not be coupled to the processor-memory bus 101. Additionally, the peripheral devices shown coupled to the system VO bus 131 may be coupled to the processor-memory bus 101; in addition, in some implementations only a single bus may exist with the processors 102 through 105, the memory controller 122, and the peripheral devices 132 through 136 coupled to the single bus.

Figure 2:
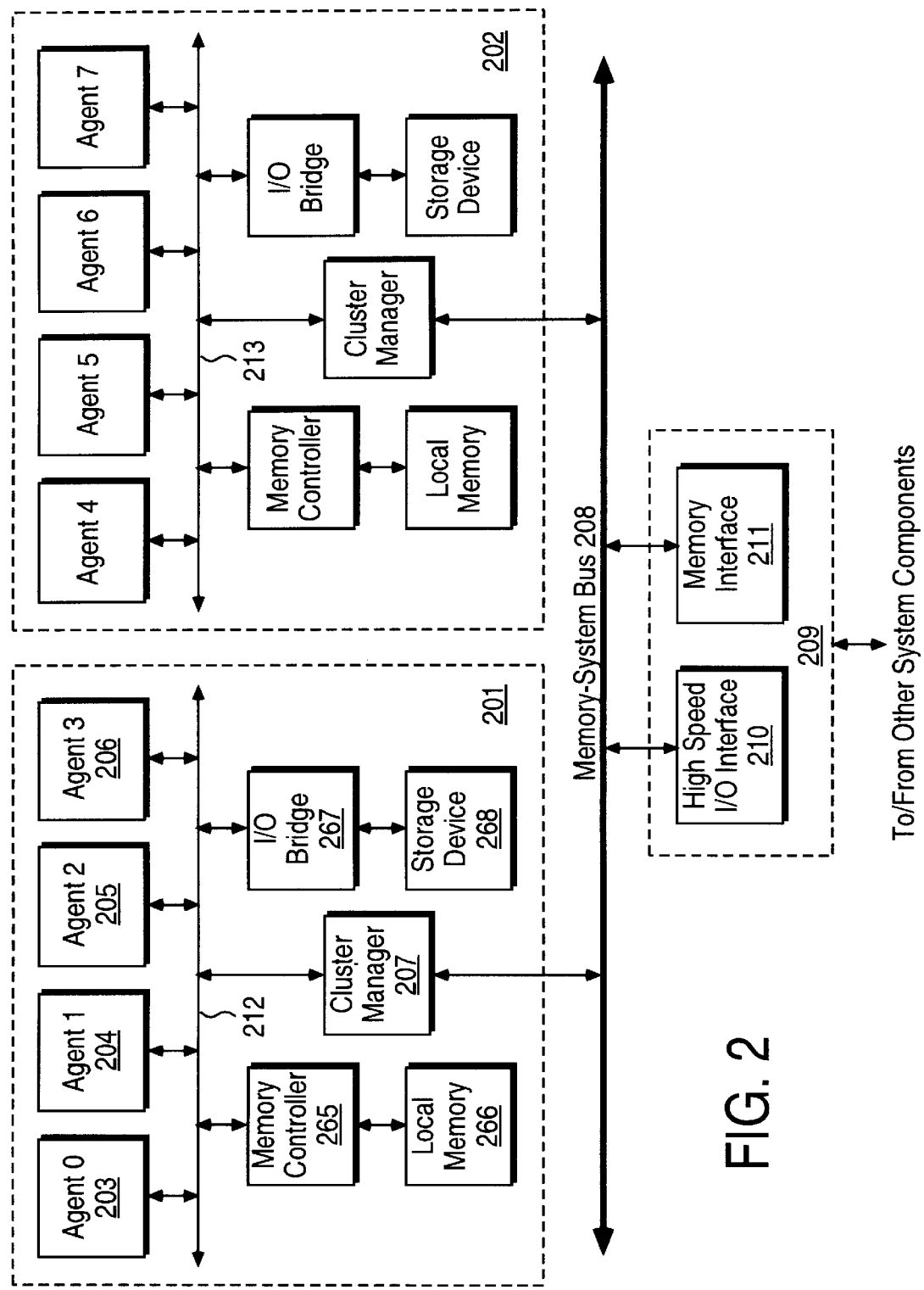
FIG. 2 is a block diagram illustrating a bus cluster system such as may be used with one embodiment of the present invention.

FIG. 2 is a block diagram illustrating a bus cluster system such as may be used with one embodiment of the present invention. FIG. 2 shows two clusters 201 and 202 of agents. Each of these clusters is comprised of a number of agents. For example, the cluster 201 is comprised of four agents 203–206 and a cluster manager 207, which may include another cache memory (not shown), coupled to the bus 212. The agents 203–206 can include microprocessors, co-processors, digital signal processors, etc.; for example, the agents 203 through 206 may be the same as the processor 105 shown in FIG. 1. The cluster manager 207 and its cache are shared between these four agents 203–206. Each cluster is coupled to a memory-system bus 208. These clusters 201 and 202 are coupled to various other components of the computer system through a system interface 209. The system interface 209 includes a high speed I/O interface 210 for interfacing the computer system to peripheral devices (not shown) and a memory interface 211 which provides access to a global main memory (not shown), such as a DRAM memory array. In one embodiment, the high speed I/O interface 210 is the bridge 124 of FIG. 1, and the memory interface 211 is the memory controller 122 of FIG. 1.

In one embodiment of the present invention, each cluster also includes a local memory controller and/or a local I/O bridge. For example, the cluster 201 may include a local memory controller 265 coupled to the processor bus 212. The local memory controller 265 manages accesses to a RAM or other local memory 266 contained within the cluster 201. The cluster 201 may also include a local I/O bridge 267 coupled to the processor bus 212. Local I/O bridge 267 manages accesses to I/O devices within the cluster, such as a mass storage device 268, or to an I/O bus, such as system I/O bus 131 of FIG. 1.

in another embodiment of the present invention, the local memory of each cluster is part of the memory and I/O space of the entire system, and is collectively referred to as the global memory and I/O space. Therefore, in this embodiment the system interface 209 need not be present because the individual local memory and I/O bridges can make up the global memory system.

In one embodiment of the present invention, the buses 212 and 213 and the memory-system bus 208 operate analogous to the processor-memory bus 101 of FIG. 1.

Certain implementations of the present invention may not require nor include all of the above components. For example, the cluster 201 or 202 may comprise fewer than four agents. Alternatively, the cluster 201 or 202 may not include the memory controller, local memory, I/O bridge, and storage device. Additionally, certain implementations of the present invention may include additional processors or other components.

In one embodiment of the present invention, bus transactions occur on the processor-memory buses described above in FIGS. 1 and 2 in a pipelined manner. That is, multiple bus transactions may be pending at the same time, wherein each is not fully completed. Therefore, when a requesting agent begins a bus transaction by driving an address onto the address bus, the bus transaction may be only one of a number of bus transactions currently pending. Although bus transactions are pipelined, the bus transactions do not have to be fully completed in order; completion replies to requests can be out-of-order.

In the bus used with one embodiment of the present invention, bus activity is hierarchically organized into operations, transactions, and phases. An operation is a bus procedure that appears atomic to software such as reading a naturally aligned memory location. Executing an operation usually requires one transaction but may require multiple transactions, such as in the case of deferred replies in which requests and replies are different transactions, or in unaligned memory operations which software expects to be atomic. In this embodiment, a transaction is the set of bus activities related to a single request, from request bus arbitration through the completion of the transaction (e.g., a normal or implicit writeback response) during the Response Phase.

In one embodiment, a transaction contains up to six distinct phases. However, certain phases are optional based on the transaction and response type. Alternatively, additional phases could also be added. A phase uses a particular signal group to communicate a particular type of information. In one implementation, these phases are:

Arbitration Phase
Request Phase
Error Phase
Snoop Phase
Response Phase
Data Transfer Phase In one mode, the data transfer phase is optional and is used if a transaction is transferring data. The data phase is request-initiated if the data is available at the time of initiating the request (for example, for a write transaction). The data phase is response-initiated if the data is available at the time of generating the transaction response (for example, for a read transaction). A transaction may contain both a request-initiated data transfer and a response-initiated data transfer.

Figure 3:
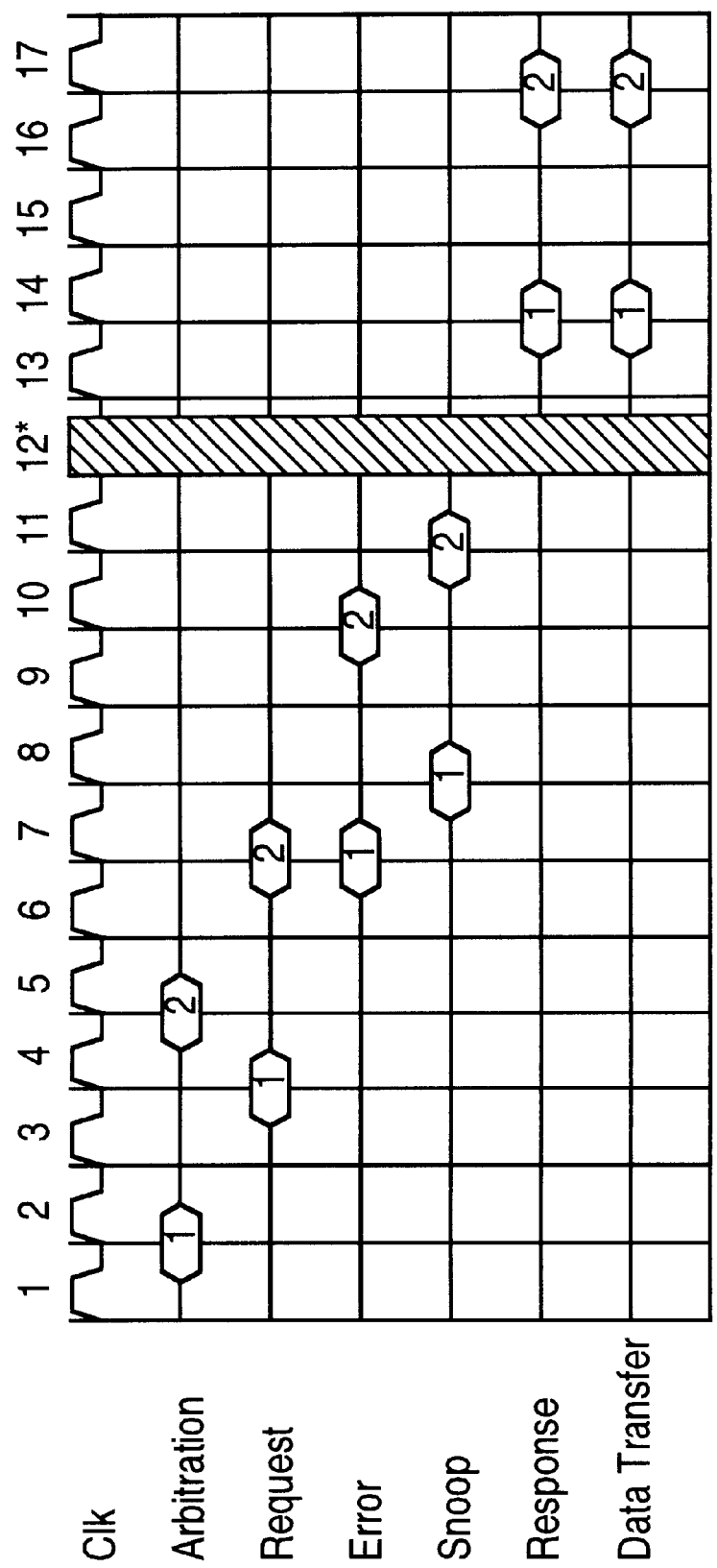
FIG. 3 shows an example of overlapped phases for two transactions according to one embodiment of the present invention.

Different phases from different transactions can overlap, thereby pipelining bus usage and improving bus performance. FIG. 3 shows an example of overlapped phases for two transactions. Referring to FIG. 3, transactions begin with an arbitration phase, in which a requesting agent becomes the bus owner. The arbitration phase needs to occur only if the agent that is driving the next transaction does not already own the bus. In one implementation, bus ownership is granted to the requesting agent in the arbitration phase two or more clocks after ownership is requested.

The second phase is the request phase, in which the bus owner drives a request and address information on the bus. In one implementation, the request phase is one or more clocks after bus ownership is granted (provided there is an arbitration phase), and is two clocks long. In the first clock, an address signal is driven along with the transaction type and sufficient information to begin snooping a memory access. In the second clock, byte enables used to identify which bytes of data should be transferred if the data transfer is less than the data bus width, a transaction identifier used to uniquely identify the transaction in the event a deferred response is to be given to the request, and the requested data transfer length are driven, along with other transaction information.

The third phase of a transaction is an error phase. The error phase indicates any immediate errors, such as parity errors, triggered by the request. If an error is discovered, an error signal is asserted during the error phase by the agent which detected the error in the transaction. When an error is indicated, the transaction is immediately dropped (that is, the transaction progresses no further in the pipeline) and may be re-driven by the agent which issued the transaction. Whether the agent re-issues the transaction depends on the agent itself. In one implementation, the error phase is three clocks after the request phase.

In one embodiment, every transaction that is not canceled because of an error in the error phase has a snoop phase. The snoop phase indicates if the cache line accessed in a transaction is not valid, valid or modified (dirty) in any agent's cache. In one implementation, the snoop phase is four or more clocks from the request phase.

The snoop phase of the bus defines a snoop window during which snoop events can occur on the bus. A snoop event refers to agents transmitting and/or receiving snoop results via the bus. An agent which has snoop results which need to be driven during the snoop phase drives these snoop results as a snoop event during the snoop window. All snooping agents coupled to the bus, including the agent driving the results, receive these snoop results as a snoop event during the snoop window. In one implementation, the snoop window is a single bus clock.

The response phase indicates whether the transaction failed or succeeded, whether the response is immediate or deferred, whether the transaction will be retried, or whether the transaction includes data phases. If a transaction contains a response-initiated data phase, then it enters the data transfer phase along with the response phase.

If the transaction does not have a data phase, then that transaction is complete after the response phase. If the requesting agent has write data to transfer or has requested read data, the transaction has a data phase which may extend beyond the response phase in the former case and will be coincident with or extend beyond the response phase in the latter case. The data phase occurs only if a transaction requires a data transfer. The data phase can be response initiated (for example, by the memory controller or another processor) or request initiated.

The bus accommodates deferred transactions by splitting a bus transaction into two independent transactions. The first transaction involves a request by a requesting agent and a response by the responding agent. In one embodiment the request comprises the sending of an address on the address bus and a first token (also referred to as a transaction identifier). The response includes the sending of the requested data (or completion signals) if the responding agent is ready to respond. In this case, the bus transaction ends.

However, if the responding agent is not ready to complete the bus transaction, then the responding agent may send a deferred response over the bus during the response phase. Sending of a deferred response allows other transactions to be issued and not be held up by the completion of this transaction. The requesting agent receives this deferred response. When the responding agent is ready to complete the deferred bus transaction, the responding agent arbitrates for ownership of the bus. Once bus ownership is obtained, the responding agent sends a deferred reply transaction including a second token on the bus. The requesting agent monitors the bus and receives the second token as part of the deferred reply transaction. The requesting agent latches the second token and determines whether the second token sent from the responding agent matches the first token. If the requesting agent determines that the second token from the responding agent does not match the first token (which the requesting agent generated), then the data on the bus (or the completion signal) is ignored and the requesting agent continues monitoring the bus. If the requesting agent determines that the second token from the responding agent does match the first token, then the data on the bus (or the completion signals) is the data originally requested by the requesting agent and the requesting agent latches the data on the data bus.

It is to be appreciated that, due to the pipelined nature of the bus, multiple transactions can be at different stages of the bus at different times. For example, one transaction can be in the snoop phase, while a second transaction is in the error phase, and yet a third transaction can be in the request phase. Thus, error signals and request signals can both be issued concurrently on the bus even though they correspond to different transactions.

In one embodiment of the present invention, up to eight transactions can be outstanding on the bus at any particular time and up to sixteen transactions can be waiting for a deferred response at any particular time.

Figure 4:
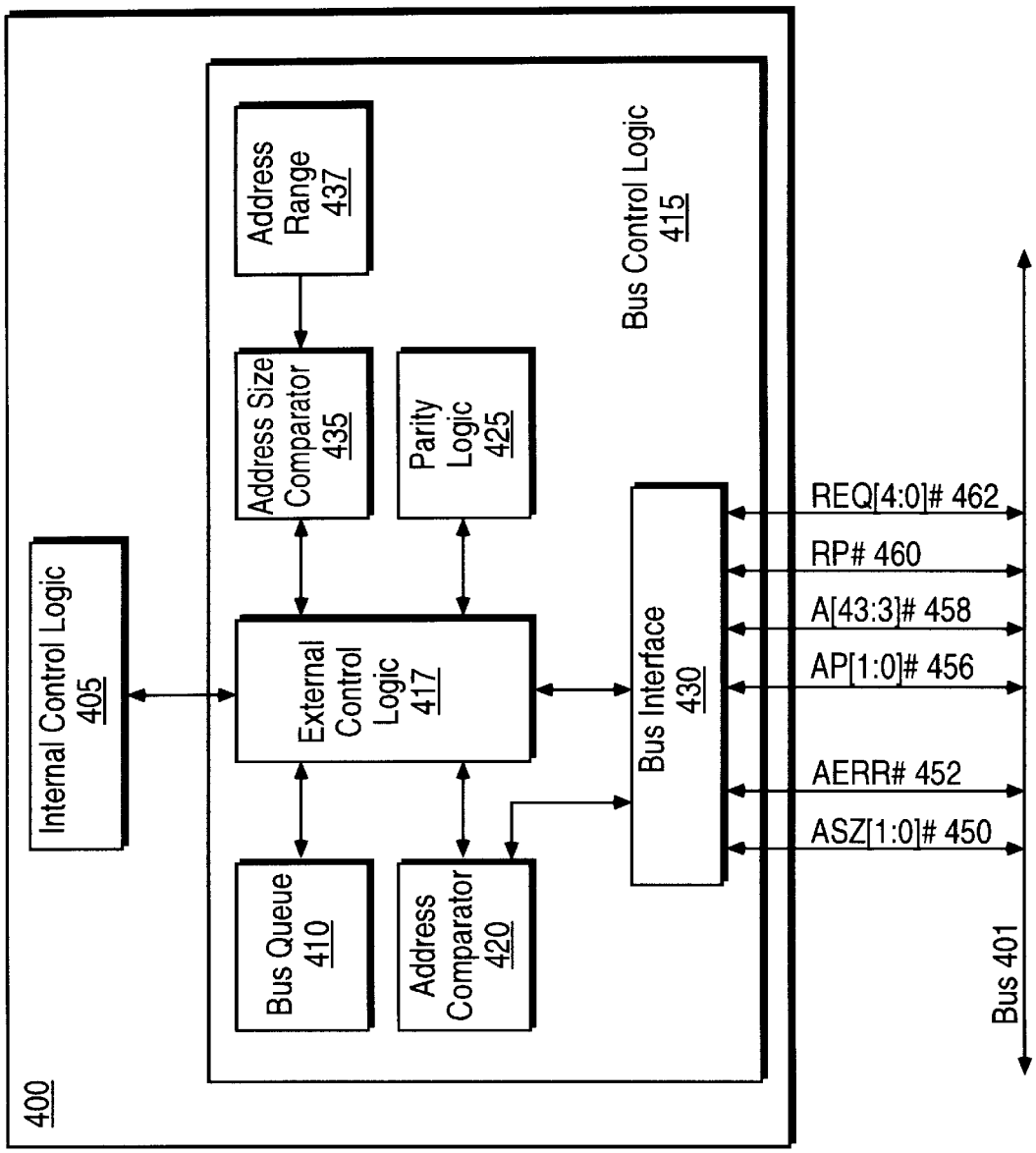
FIG. 4 is a block diagram illustrating the control logic used with one embodiment of the present invention.

FIG. 4 is a block diagram illustrating the control logic used with one embodiment of the present invention. FIG. 4 shows an agent 400 coupled to a bus 401. In one embodiment, the bus 401 is the bus 101 of FIG. 1. In an alternate embodiment, the bus 401 is one of the buses of FIG. 2, such as the bus 212.

The agent 400 includes an internal control logic 405 and a bus control logic 415 The internal control logic 405 is the internal logic for performing the function of the agent 400. For example, if the agent 400 were a microprocessor, then the control logic 405 includes an instruction fetch unit(s), an execution unit(s), etc. Information which is required by the internal control logic 405 from other agents in the computer system is obtained via the bus 401.

The bus control logic 415 includes a bus queue 410, an external control logic 417, an address comparator 420, parity logic 425, a bus interface 430, an address size comparator 435, and an address range 437. The bus control logic 415 acts as an interface between the agent 400 and the bus 401, both of which may run at different clock speeds. The bus interface 430 contains the latches and necessary circuitry for interfacing between the bus control logic 415 and the bus 401.

The external control logic 417 implements the system bus protocol which allows the agent 400 to communicate with other agents via the bus 401. Thus, it to be appreciated that different bus protocols can be used with the present invention by changing the external control logic 417. The external control logic 417 transfers requests between the bus 401 and the internal control logic 405. The external control logic 417 also tracks the status of all outstanding requests on the bus 401, including those issued by the agent 400, using the bus queue 410.

The bus control logic 415 also includes an address comparator 420 and parity logic 425. The parity logic 425 calculates parity for requests and addresses being issued on the bus, and also checks the parity of requests and addresses which are received from the bus. The use of parity is well-known to those skilled in the art and thus will not be discussed further except as it pertains to the present invention.

The address comparator 420 compares the addresses of requests to be issued on the bus 401 by the agent 400 to a set of address ranges. Based on the results of this comparison, the external bus control logic 415 can indicate the proper address space for a particular request to the other agents on the bus 401, as discussed in more detail below.

An address size comparator 435 is also included in the bus control logic 415. The address size comparator 435 compares the size of an address received from the bus to the address space(s) supported by the agent. In one embodiment, the address space(s) supported by the agent is stored in an address range register 437. Thus, when an agent receives the address size information corresponding to a request, as discussed in more detail below, the gent can readily determine whether the address is within the range supported by the agent.

According to one embodiment of the present invention, four different address spaces are supported. These four address spaces are a 32-bit address space, a 36-bit address space, a 44-bit address space, and an undefined space which is reserved for future use. In one implementation, the undefined address space would be a 64-bit address space. However, it is to be appreciated that other address spaces greater than 44 bits could be used. It is to be appreciated that these address spaces overlap. For example, the first 32 bits of each of the address spaces is the same.

Figure 8:
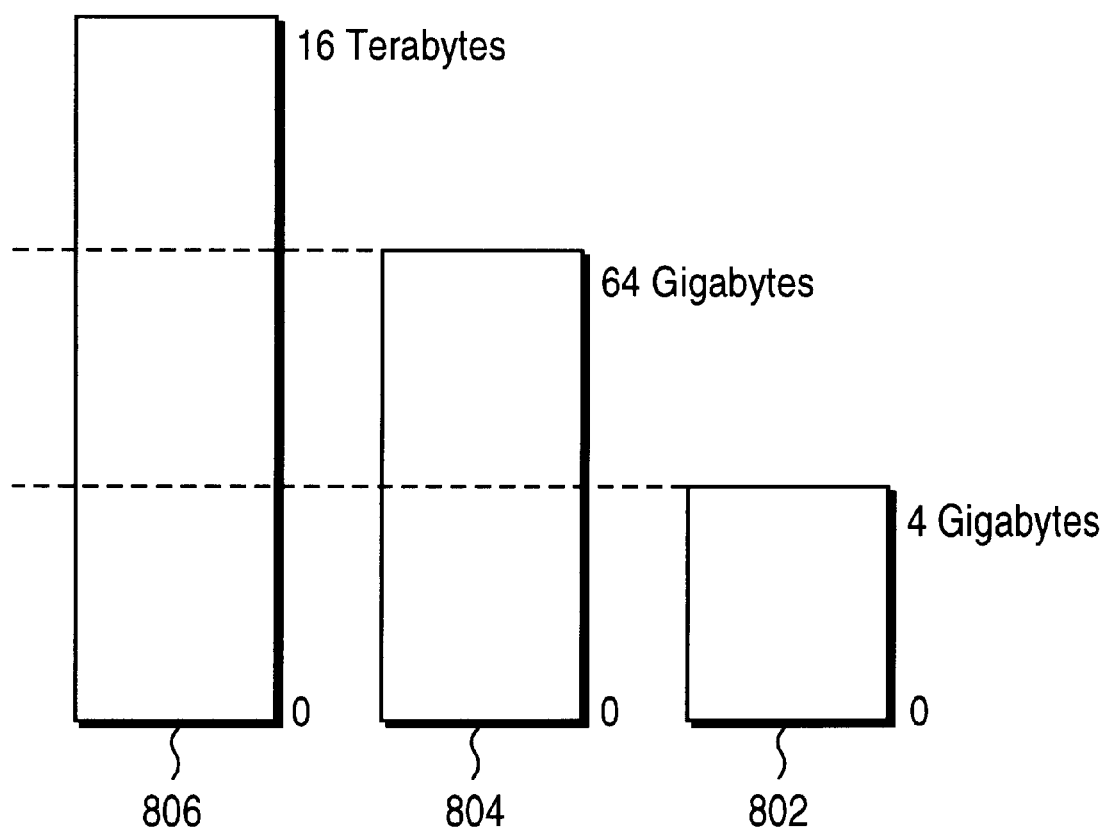
FIG. 8 illustrates overlapping address spaces according to one embodiment of the present invention.

FIG. 8 illustrates overlapping address spaces according to one embodiment of the present invention. Three different overlapping address spaces are illustrated in FIG. 8: a 32-bit address space 802, a 36-bit address space 804, and a 44-bit address space 806. As shown, the 32-bit address space 802 allows locations from zero to 4 gigabytes to be accessed, the 36-bit address space 804 allows locations from zero to 64 gigabytes to be accessed, and the 44-bit address space 806 allows locations from zero to 16 terabytes to be accessed. As can be seen in FIG. 8, the first 4 gigabytes of each of the three address spaces 802, 804 and 806 overlaps. Similarly, the first 64 gigabytes of the address spaces 804 and 806 overlap.

Returning to FIG. 4, in operation the address comparator 420 checks whether any of the bits [35:32] of the address corresponding to the request to be issued on the bus 401 is a "1". The address comparator 420 also checks whether any of the bits [43:36] of the address corresponding to the request to be issued on the bus 401 is a "1". If none of the bits [43:32] is a "1", then the address is in the 32-bit address space. If any of the bits [43:36] is a "1", then the address is in the 44-bit address space. And, if any of the bits [35:32] is a "1" and none of the bits [43:36] is a "1", then the address is in the 36-bit address space.

It is to be appreciated that the address comparator 420 only compares the address to be issued on the bus to the address spaces which this agent can support. For example, if the agent 400 only supports up to a 36-bit address space, then, in this example, the agent 400 would indicate either a 32-bit address space or a 36-bit address space, based on the values of bits [35:32]. In other words, an agent issuing a request on the bus will only provide the address size indications that it is able to support.

The address comparator 420 outputs, via the bus interface 430 an indication of the address space used by the request. In one embodiment, this indication is provided via the address size ASZ[1:0]# control lines 450. The indication of the address space is encoded on the ASZ[1:0]# control lines 450. The encoding used by one embodiment of the present invention is shown in Table I.

TABLE I

| ASZ[1:0]# | Address Size |
| --- | --- |
| 00 | 32-bit |
| 01 | 36-bit |
| 10 | 44-bit |
| 11 | reserved for future use |

Additional address and control lines 452–462 are also shown in FIG. 4. It is to be appreciated that additional control and data lines are also coupled to the agent 400 and the bus 401; however, these additional control and data lines have not been shown so as not to clutter the drawings. The A[43:3]# lines 458 are used to place addresses from the agent 400 onto the bus 401 and also to retrieve addresses from the bus 401 In the illustrated embodiment the address lines [2:0] for the three least significant bits of the address are not included because the addresses are accessed on an 8-byte boundary. Also in the illustrated embodiment, the agent 400 supports a 44-bit address size. For agents which support smaller address sizes, some of the lines corresponding to the upper bits would not be included. For example, if the agent uses a 36-bit address size, then the control lines 458 would include only lines [35:3].

The AP[1:0]# lines 456 carry the address parity information corresponding to the address placed on the bus. The address parity information is generated by the parity logic 425 of the agent 400 which issues the request on the bus. In one embodiment, the address is split into upper and lower bits and a different parity calculation is made for each of these sets of bits. In one implementation, the AP[0]# line carries the address parity for the lower bits, bits [23:3], and the AP[1]# line carries the address parity for the upper bits, bits [43:24]. The agent 400 receives the address parity information and the parity logic 425 calculates the parity for the received address and checks it against the received address parity information. The parity logic 425 asserts a signal, via the bus interface 430 on the AERR# line 452 if an address parity error is detected.

In one embodiment of the present invention, the agent 400 always checks parity for the lower bits, bits [23:3], and checks parity for the upper bits only if it can support the address space of the request. For example, if the request is in the 44-bit address space, then the agent checks parity for the upper bits, bits [43:24], only if it can support the 44-bit address space. By way of another example, if the request is in the 36-bit address space, then the agent checks parity for the upper bits, bits [36:24], only if it can support the 36-bit address space. The agent 400 knows whether it can support the address space of the request by the ASZ[1:0]# signals which were asserted with the request.

Therefore, if the address space of the request cannot be supported by the agent 400 then the parity logic 425 only checks the lower bits, bits [23:3], for parity.

The agent 400 receives a request from a requesting agent on the REQ[4:0]# lines 462, along with request parity information on the RP# line 460. The request parity information is generated by the parity logic 425 of the agent which issues the request. The agent 400 which receives the request then calculates the parity of the request received on the REQ[4:0]# lines 462 and compares the calculated request parity to the request parity information received on the RP# line 460. If the two parities do not match, then the agent asserts, via interface 430 the AERR# signal 452.

It is to be appreciated that the agent 400 provides an indication of the address space corresponding to the request being issued on the bus, not the largest address space supported by the agent 400.

According to one embodiment of the present invention, agents only perform parity calculations on the actual address size of the request. For example, if the request is in the 36bit address range then the agents only perform parity calculations on the 36 bits, even though they may be able to support the 44-bit address space.

Figure 5:
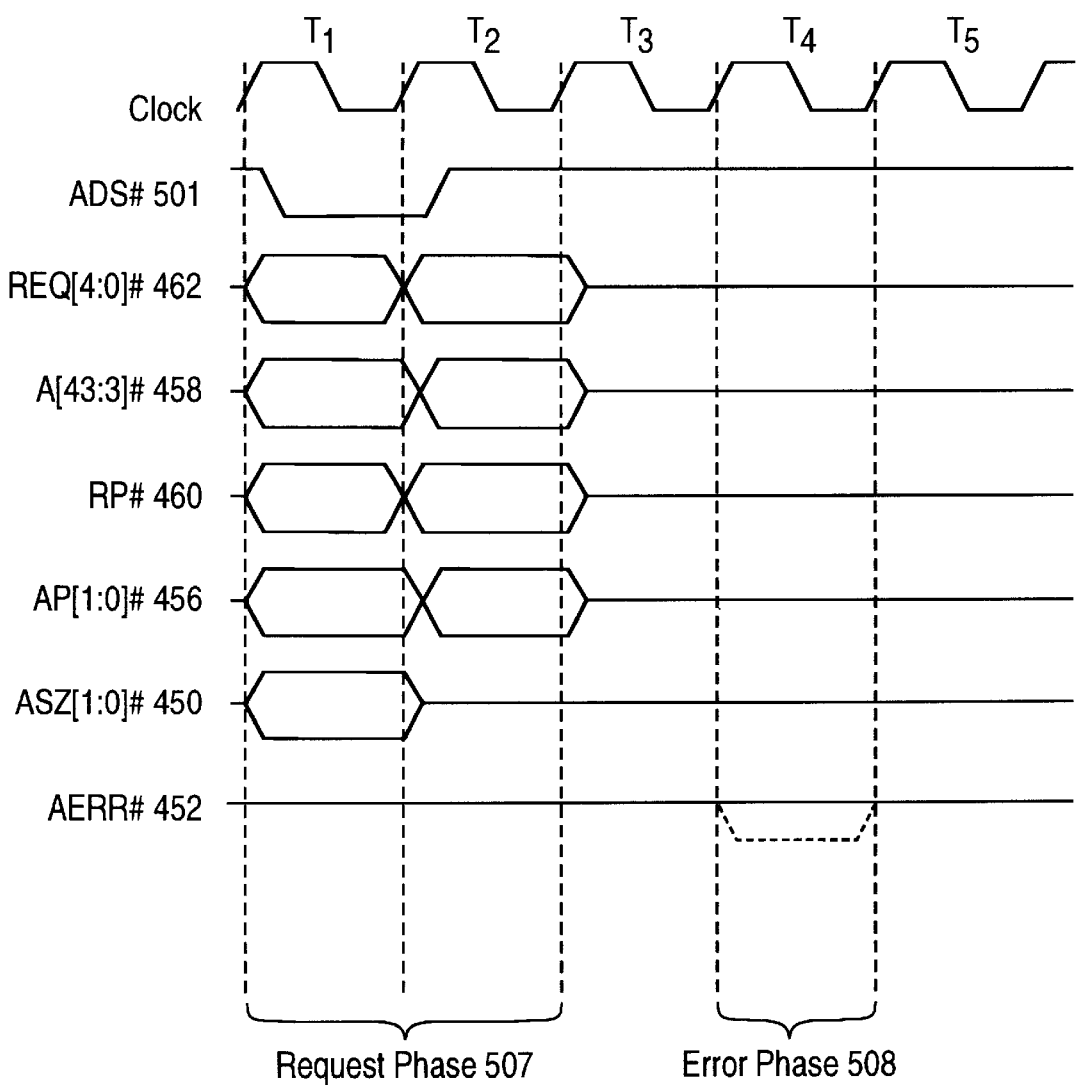
FIG. 5 is a timing diagram illustrating the timing of selected signals for a request according to one embodiment of the present invention.

FIG. 5 is a timing diagram illustrating the timing of selected signals for a request according to one embodiment of the present invention. The request phase 507 and error phase 508 for the request are in clocks $t_1/t_2$, and $t_4$, respectively. The address strobe signal (ADS#) 501 is asserted in clock $t_1$ to indicate that a valid address is on the bus. Also in clock $t_1$, the address is placed on the bus via A[43:3]# lines 458, along with the address parity (AP[1:0]# 456), address size (ASZ[1:0]# 450), request information (REQ [4:0]# 462), and request parity (RP# 460). In clock $t_4$, any address or request parity errors (AERR# 452) are asserted on the bus.

In the illustrated embodiment, the address size is illustrated as two bits being placed on the bus in the first clock cycle of the request phase. However, it is to be appreciated that the address size information can be placed on the bus in other manners and/or at other times. In one alternate embodiment, the address size is placed on the bus in the second clock of the request phase (that is, clock $t_2$ of FIG. 5). In another alternate embodiment, the address size is a single control line rather than the two lines as illustrated. In this alternate embodiment, the first bit of the address size information is placed on the ASZ# line in the first clock of the request phase, and the second bit of the address size information is placed on the ASZ# line in the second clock of the request phase.

Figure 6:
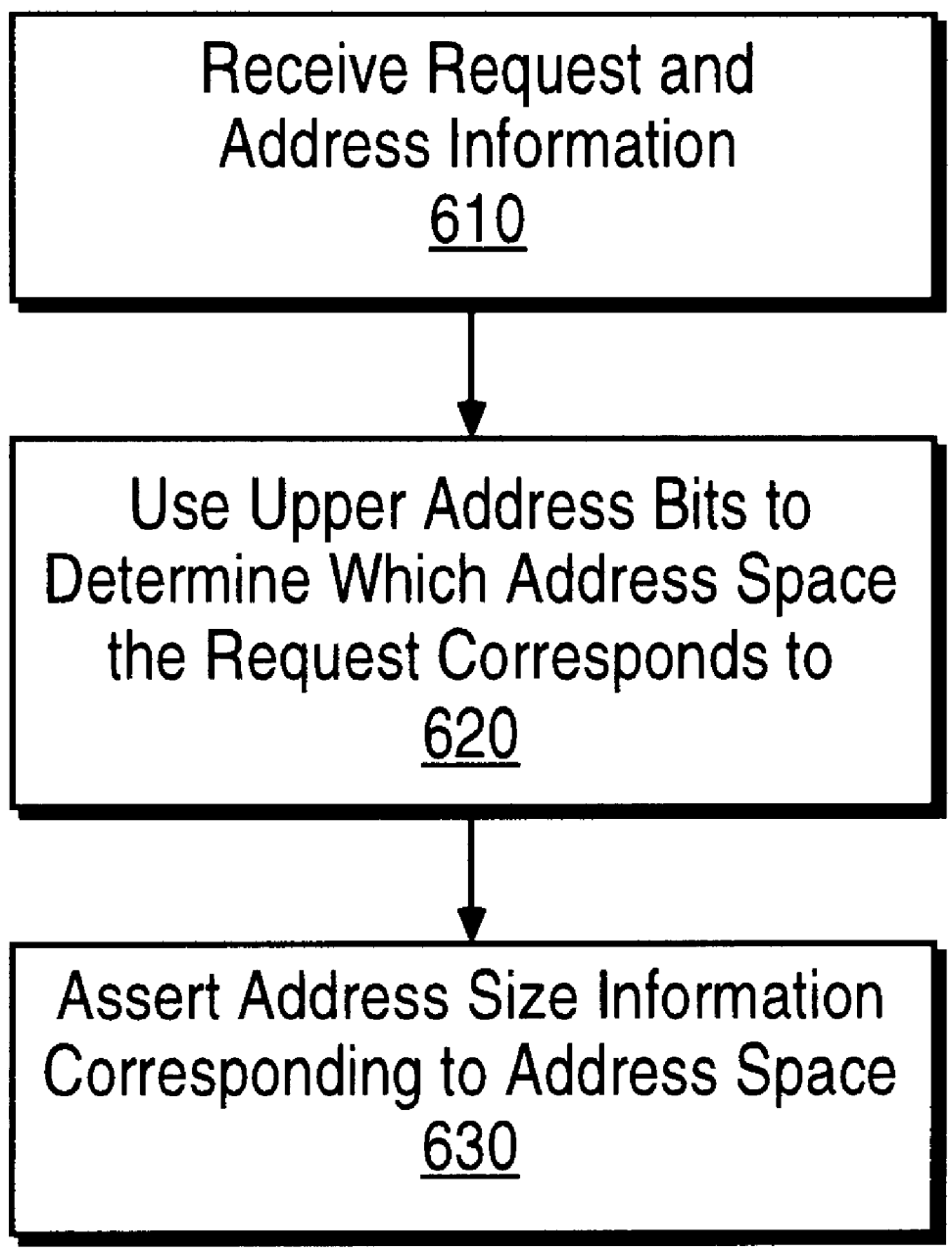
FIG. 6 illustrates the steps followed by an agent in issuing a request on the bus according to one embodiment of the present invention.

FIG. 6 illustrates the steps followed by an agent in issuing a request on the bus according to one embodiment of the present invention. The bus control logic of the agent first receives, from the internal control logic of the agent, a request and address corresponding to the request, step 610. The bus control logic then uses the upper bits of the address to determine which address space the address is in, step 620. This is done, as discussed above, by checking which, if any, of the bits above the first 32 bits are a "1". The bus control logic then asserts address size information corresponding to this address space onto the bus, step 630, thereby indicating to the other agents on the bus which address space the request corresponds to.

Figure 7:
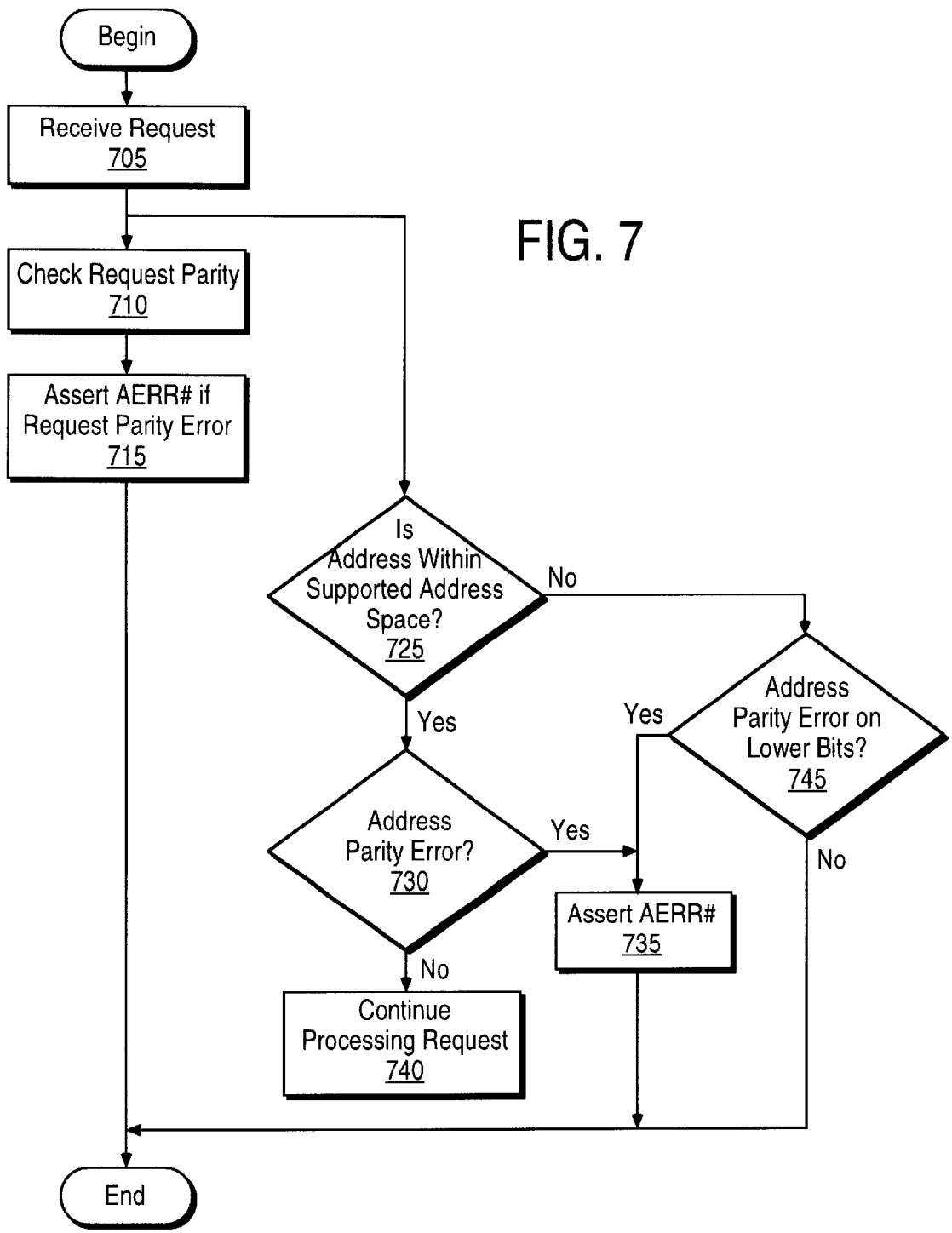
FIG. 7 illustrates the steps followed by an agent when receiving a request from the bus according to one embodiment of the present invention.

FIG. 7 illustrates the steps followed by an agent when receiving a request from the bus according to one embodiment of the present invention. The agent first receives the request from the bus, step 705. The bus control logic then calculates the request parity for the received request and compares it to the received request parity, step 710. The control logic then asserts an AERR# signal if there is a request parity error, step 715.

Concurrent with checking for a request parity error in steps 710 and 715, the control logic checks whether the received address is within the address space supported by the agent, step 725. If the address is within the address space supported by the agent, then the agent calculates the address parity for the received address and compares both address parity bits to the parities it calculated for the address to determine if there is a parity error in the received address, step 730. If there is a parity error in the received address, then the bus logic asserts the AERR# signal, step 735. However, if there is not a parity error in the received address, then the agent continues processing of the request, step 740. This continued processing includes decoding the address of the request to determine whether this agent is the target of the request, and responding to the request if the agent is the target.

Returning to step 725, if the bus control logic determines that the received address is not within the address space supported by the agent, then the bus control logic calculates the parity of the lower bits of the received address and compares this calculated parity to the parity bit corresponding to the lower bits of the address, step 745. If there is a parity error in the lower bits, then the agent asserts an AERR# signal 735. Otherwise, any processing of this request by the agent ends. No decoding of the address is necessary because the agent knows, based on the receipt of the ASZ[1:0]# signals, that the address is outside the address space supported by the agent. Therefore, this agent cannot be the target of the request.

Thus, it is to be appreciated that the present invention does not incorrectly assert AERR# if the address is outside the address space supported by the agent. It should be noted that this address parity checking is done correctly before the address is decoded and before the agent determines whether it is the target of the address. Additionally, even though the agent does not support the address space of the request, the agent can still perform address parity checking on part of the address (the lower bits, such as bits [23:3]). Thus, checking of address parity on part of the address is performed, even though the agent cannot check the entire address, thereby providing additional protection against address errors.

In an alternate embodiment of the present invention, step 745 is not included. In this alternate embodiment, the agent does not perform any address parity checking if the received address is outside the address space of the agent.

In the discussions above, particular address spaces have been mentioned. However, it is to be appreciated that other address spaces can be used within the spirit and scope of the present invention.

Also in the discussions above, reference is made to specific bus protocols and timing for indicating the address space corresponding to the request. However, it is to be appreciated that these protocols and timings are only examples, and that any of a wide variety of bus protocols and signal timings can be used within the spirit and scope of the present invention.

Thus, the present invention provides a mechanism for supporting multiple overlapping address spaces on a shared bus. An indication of the address space corresponding to a request from an agent is provided to the other agents coupled to the bus. This indication advantageously allows the other agent(s) to determine whether the request is within the address space supported by the other agent, and whether parity checking of the address can be performed by the other agent.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

Thus, a method and apparatus for supporting multiple overlapping address spaces on a shared bus has been described.

What is claimed is:

1. An apparatus comprising:

a bus interface to receive a set of address lines;

comparator circuitry coupled to the bus interface to receive a set including all bits corresponding to the set of address lines and to determine an address represented by bits on the address lines to determine an address space, from a plurality of address spaces, to which the address corresponds, wherein addresses in a first address space require bits from all address lines to represent addresses therein and addresses in other address spaces of the plurality of address spaces are represented by bits from a subset of the address lines; and a parity checking circuit coupled to receive the address and to check parity for the address, wherein parity checking is performed only on the set of address lines used to represent the address if the address is within a supported address space, and a subset of the set of address lines if the address is outside the supported address space.

2. The apparatus of claim 1 wherein the plurality of address spaces comprise at least a 32-bit address space, a 36-bit address space, and a 44-bit address space.

3. The apparatus of claim 2 further comprising a 64-bit address space.

4. A method comprising:

receiving a set of bits, wherein the number of bits in the set of bits corresponds to a largest address space in a plurality of address spaces supported;

determining an address space represented by the set of bits and an address space of the plurality of address spaces to which the address corresponds, wherein addresses in a first address space of the plurality of address spaces are represented by all bits in the set of bits and addresses in other address spaces are represented by a subset of the set of bits;

checking parity of the address on all bits used to represent the address if the address is within a supported address space, and on a subset of the bits used to represent the address if the address is outside the supported address space.

5. The method of claim 4 wherein the plurality of address spaces comprise at least a 32-bit address space, a 36-bit address space, and a 44-bit address space.

6. The method of claim 5 further comprising a 64-bit address space.

7. A computer system comprising:

a plurality of bus agents coupled to a bus, wherein each agent supports one or more address spaces of a plurality of shared address spaces, at least one agent comprising:

a bus interface to receive a set of address lines;

comparator circuitry coupled to the bus interface to receive a set including all bits corresponding to the set of address lines and to determine an address represented by bits on the address lines to determine an address space, from a plurality of address spaces, to which the address corresponds, wherein addresses in a first address space require bits from all address lines to represent addresses therein and addresses in other address spaces of the plurality of address spaces are represented by bits from a subset of the address lines; and a parity checking circuit coupled to receive the address and to check parity for the address, wherein parity checking is performed only on bits used to represent the address if the address is within a supported address space, and a subset of the bits used to represent the address if the address is outside the supported address space.

8. The apparatus of claim 7 wherein the plurality of address spaces comprise at least a 32-bit address space, a 36-bit address space, and a 44-bit address space.

9. The apparatus of claim 8 further comprising a 64-bit address space.

* * * * *

UNITED STATES PATENT AND TRADEMARK OFFICE
CERTIFICATE OF CORRECTION

PATENT NO. : 6,253,302 B1  Page 1 of 1
DATED : June 26, 2001
INVENTOR(S) : Mac Williams et al.

It is certified that error appears in the above-identified patent and that said Letters Patent is hereby corrected as shown below:

Column 1,
Line 14, delete "Modem", insert -- Modern --.
Line 28, delete "modem", insert -- modern --.

Column 4,
Line 34, insert -- 131 -- after "system bus".
Line 47, delete "VO", insert -- I/O --.

Column 8,
Line 32, insert -- is -- after "Thus, it ".
Line 63, delete "gent", insert -- agent --.

Signed and Sealed this

Fourth Day of June, 2002

*Attest:*

JAMES E. ROGAN
*Attesting Officer*   *Director of the United States Patent and Trademark Office*